(12) United States Patent
Zou et al.

(10) Patent No.: US 10,884,888 B2
(45) Date of Patent: Jan. 5, 2021

(54) FACILITATING COMMUNICATION AMONG STORAGE CONTROLLERS

(71) Applicant: International Business Machines Corporation, Armonk, NY (US)

(72) Inventors: Bo Zou, Urumqi (CN); Yi Ning Chu, Shanghai (CN); Chuan Li, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 10 days.

(21) Appl. No.: 16/254,064

(22) Filed: Jan. 22, 2019

(65) Prior Publication Data
US 2020/0233763 A1 Jul. 23, 2020

(51) Int. Cl.
*G06F 11/07* (2006.01)
*G06F 11/20* (2006.01)

(52) U.S. Cl.
CPC ...... *G06F 11/2092* (2013.01); *G06F 11/0766* (2013.01); *G06F 11/0784* (2013.01); *G06F 2201/82* (2013.01)

(58) Field of Classification Search
CPC ............. G06F 11/2092; G06F 11/0766; G06F 11/0784
See application file for complete search history.

(56) References Cited

U.S. PATENT DOCUMENTS

| | | | |
|---|---|---|---|
| 5,790,775 A * | 8/1998 | Marks | G06F 11/1658 |
| | | | 714/5.11 |
| 6,487,677 B1 | 11/2002 | Jantz et al. | |
| 6,834,257 B2 | 12/2004 | Keller | |
| 7,043,663 B1 * | 5/2006 | Pittelkow | G06F 11/2092 |
| | | | 714/4.4 |
| 7,194,445 B2 | 3/2007 | Chan et al. | |
| 7,346,810 B2 | 3/2008 | Bartlett et al. | |
| 8,090,997 B2 | 1/2012 | Hampton | |
| 8,725,946 B2 | 5/2014 | Petersen et al. | |
| 9,367,412 B2 | 6/2016 | Elpula et al. | |

(Continued)

FOREIGN PATENT DOCUMENTS

CN 106648473 A 5/2017

OTHER PUBLICATIONS

Koo et al., "Dual RAID technique for ensuring high reliability and performance in SSD," 2015 IEEE/ACIS 14th International Conference on Computing and Information Sciences (ICIS), 2015, 6 pages. DOI: 10.1109/ICIS.2015.7166627.

(Continued)

*Primary Examiner* — Yolanda L Wilson
(74) *Attorney, Agent, or Firm* — Nathan M. Rau

(57) ABSTRACT

A method, system and computer program product for facilitating communication among storage controllers of a storage system. The method comprises detecting an event indicative of status change in a storage system having a plurality of storage controllers; determining that it is needed to communicate the event from a first storage controller to a second storage controller of the storage controllers; transmitting a message about the event from the first storage controller to a host in response to failure of a dedicated link between the first storage controller and the second storage controller; and forwarding the message from the host to the second storage controller.

18 Claims, 6 Drawing Sheets

(56) References Cited

U.S. PATENT DOCUMENTS

| | | | | |
|---|---|---|---|---|
| 2004/0049710 A1* | 3/2004 | Ashmore | ............ | G06F 11/0784 |
| | | | | 714/6.11 |
| 2009/0292834 A1* | 11/2009 | Neemidge | ............. | G06F 3/0689 |
| | | | | 710/19 |
| 2013/0086415 A1* | 4/2013 | Petersen | ............. | G06F 11/2069 |
| | | | | 714/6.3 |
| 2014/0277608 A1* | 9/2014 | Debouk | ................... | G05B 9/02 |
| | | | | 700/79 |
| 2015/0058559 A1 | 2/2015 | Jibbe et al. | | |
| 2015/0121129 A1* | 4/2015 | Hori | .................... | G06F 11/2092 |
| | | | | 714/6.22 |
| 2015/0363254 A1* | 12/2015 | Satoyama | ........... | G06F 11/0727 |
| | | | | 714/57 |
| 2016/0179641 A1* | 6/2016 | Maeda | .................... | G06F 13/00 |
| | | | | 714/6.3 |
| 2019/0164599 A1* | 5/2019 | Avraham | ............... | G11C 29/52 |

OTHER PUBLICATIONS

Zhiming et al., "Fault Detection for high Availability RAID System," The 6th International Conference on Networked Computing and Advanced Information Management, Aug. 2010, pp. 27-32.

Mell et al., "The NIST Definition of Cloud Computing: Recommendations of the National Institute of Standards and Technology," Special Publication 800-145, Sep. 2011, 7 pages, National Institute of Standards and Technology, Gaithersburg, MD.

* cited by examiner

FACILITATING COMMUNICATION AMONG STORAGE CONTROLLERS

BACKGROUND

The present disclosure relates to storage systems, and more specifically, to a method, system and computer program product for facilitating communication among storage controllers of a storage system.

In a storage system having a plurality of storage controllers, controllers coordinate each other to perform tasks such as responding to I/O requests from attached hosts and managing storage devices including problem diagnosis. It is critical in such a system to ensure synchronization of information resident in storage controllers about status of the storage system. Thus, it is important to facilitate effective and efficient communications among coordinating storage controllers.

SUMMARY

According to an embodiment of the present disclosure, a computer-implemented method is provided. The method comprises detecting, by one or more processors, an event indicative of status change in a storage system having a plurality of storage controllers. The method further comprises determining that it is needed to communicate the event from a first storage controller to a second storage controller of the storage controllers. The method further comprises transmitting a message about the event from the first storage controller to an attached host in response to failure of a dedicated link between the first storage controller and the second storage controller is interrupted. And the method further comprises forwarding the message from the host to the second storage controller.

According to another embodiment of the present disclosure, a system comprises one or more processors and a computer-readable memory coupled to the one or more processors. The computer-readable memory comprising instructions that when executed by the one or more processors perform the following actions: detecting an event indicative of status change in a storage system having a plurality of storage controllers; determining that it is needed to communicate the event from a first storage controller to a second storage controller of the storage controllers; transmitting a message about the event from the first storage controller to an attached host in response to failure of a dedicated link between the first storage controller and the second storage controller is interrupted; and forwarding the message from the host to the second storage controller.

According to another embodiment of the present disclosure, a computer program product comprises a computer readable storage medium having program instructions embodied therewith. The program instructions are executable by a processor to cause the processor to perform action of detecting an event indicative of status change in a storage system having a plurality of storage controllers; determining that it is needed to communicate the event from a first storage controller to a second storage controller of the storage controllers; transmitting a message about the event from the first storage controller to an attached host in response to failure of a dedicated link between the first storage controller and the second storage controller is interrupted; and forwarding the message from the host to the second storage controller.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

Throughout the drawings, same or similar reference numerals represent the same or similar elements.

DETAILED DESCRIPTION

Figure 1:
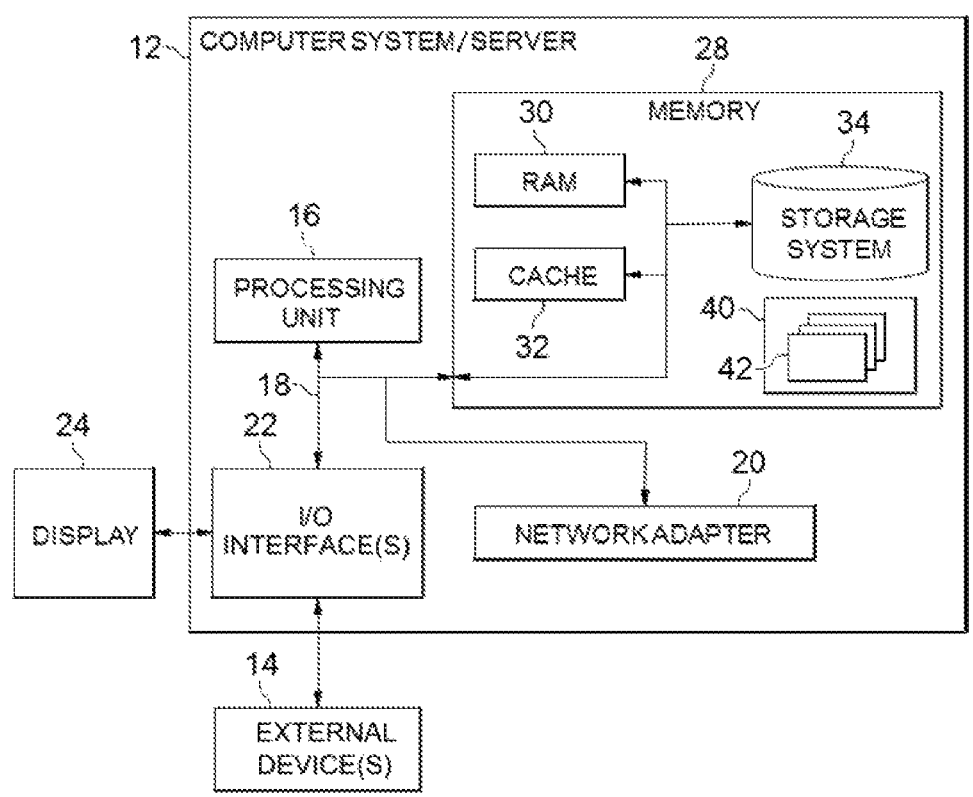
FIG. 1 depicts a cloud computing node according to an illustrative embodiment of the present disclosure.

Some embodiments will be described in more detail with reference to the accompanying drawings, in which the embodiments of the present disclosure have been illustrated. However, the present disclosure can be implemented in various manners, and thus should not be construed to be limited to the embodiments disclosed herein.

It is to be understood that although this disclosure includes a detailed description on cloud computing, implementation of the teachings recited herein are not limited to a cloud computing environment. Rather, embodiments of the present disclosure are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the disclosure described herein. Regardless, cloud computing node 10 is capable of being implemented and/or performing any of the functionality set forth hereinabove.

In cloud computing node 10 there is a computer system/server 12 or a portable electronic device such as a communication device, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
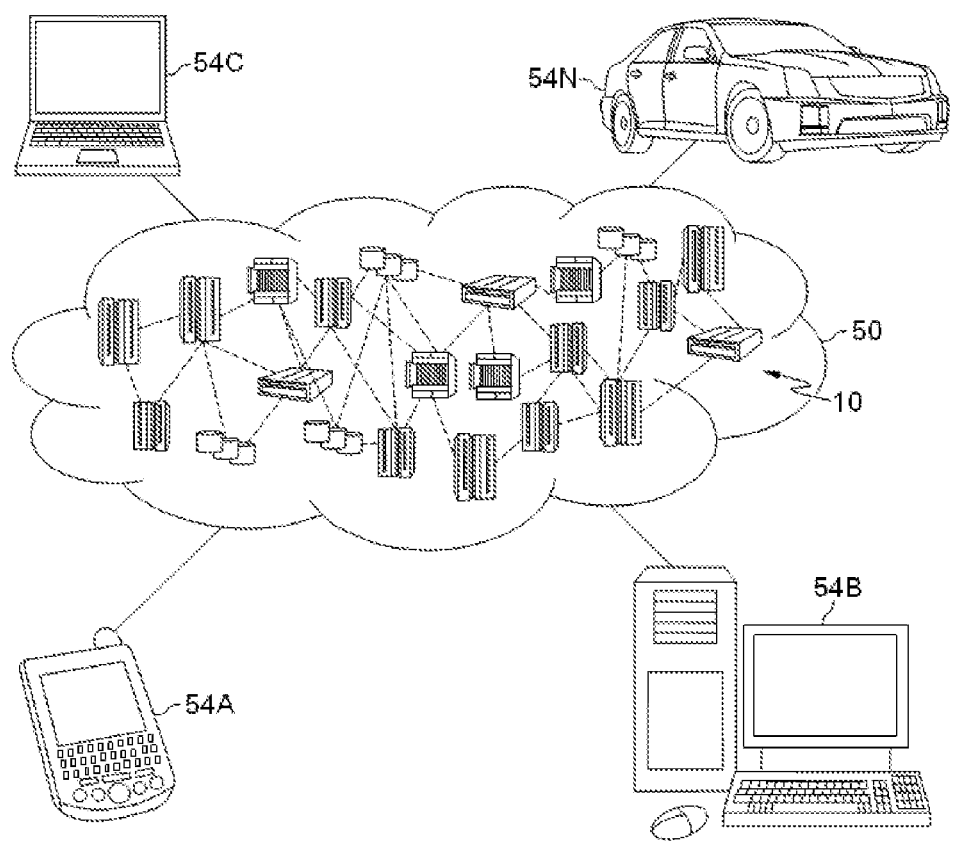
FIG. 2 depicts a cloud computing environment according to an illustrative embodiment of the present disclosure.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
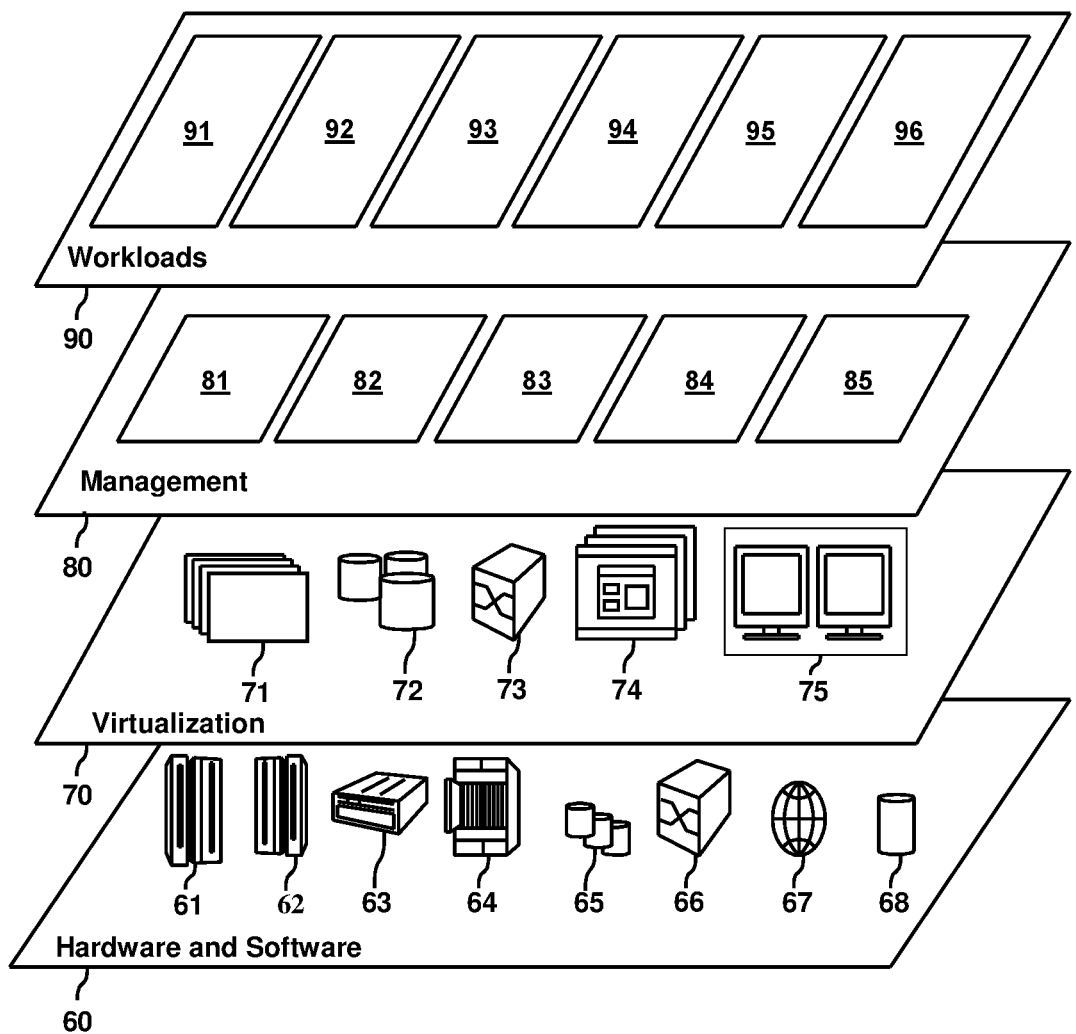
FIG. 3 depicts abstraction model layers according to an illustrative embodiment of the present disclosure.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and service processing 96.

Service processing 96 may implement a method for facilitating communication among storage controllers of a storage system. The method comprises: detecting an event indicative of status change in a storage system having a plurality of storage controllers; determining that it is needed to communicate the event from a first storage controller to a second storage controller of the storage controllers; transmitting a message about the event from the first storage controller to an attached host in response to failure of a dedicated link between the first storage controller and the second storage controller; and forwarding the message from the host to the second storage controller.

Figure 4:
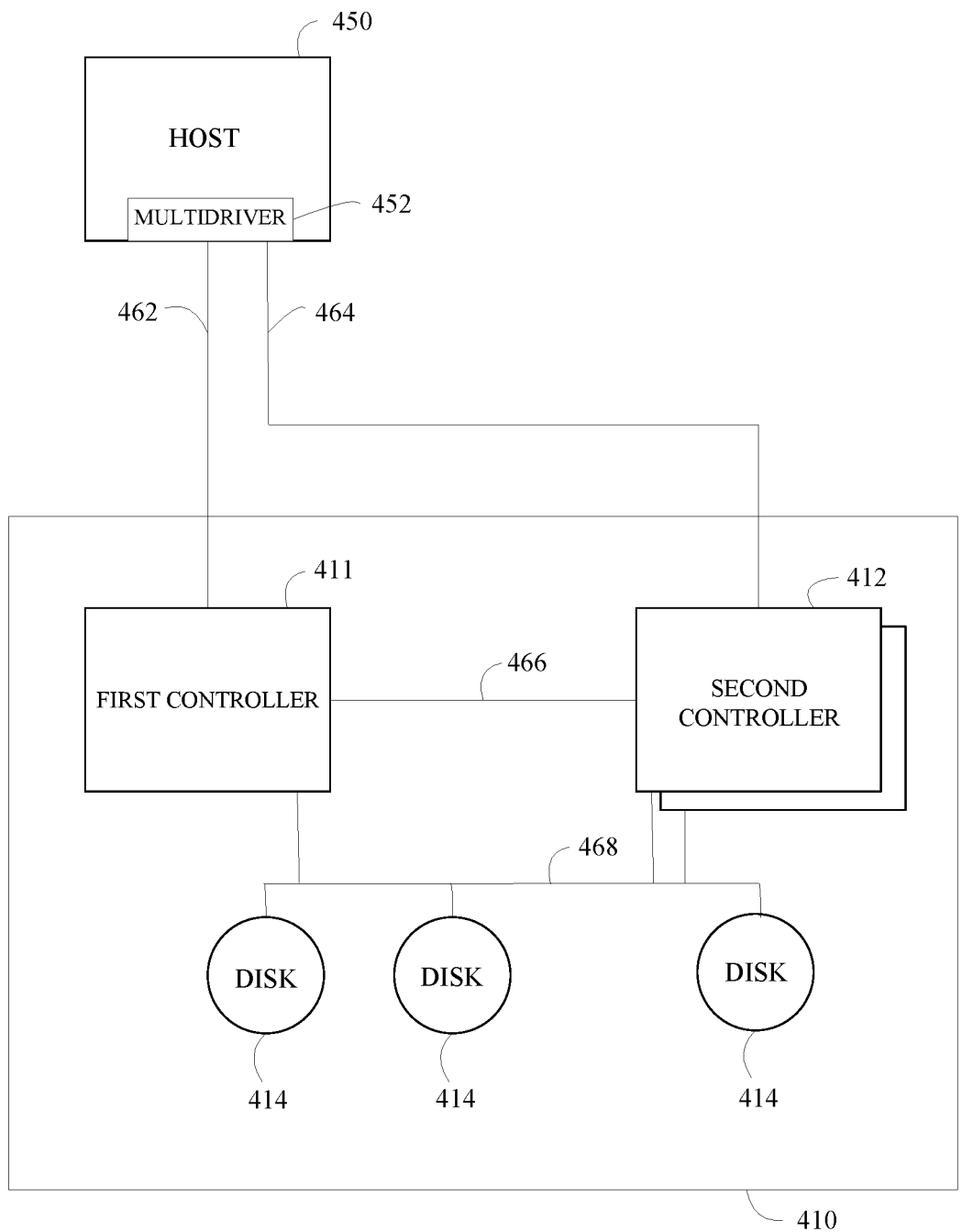
FIG. 4 illustratively shows an environment comprising a storage system having a plurality of storage controllers in which embodiments in accordance with the disclosure may be implemented.
Figure 5:
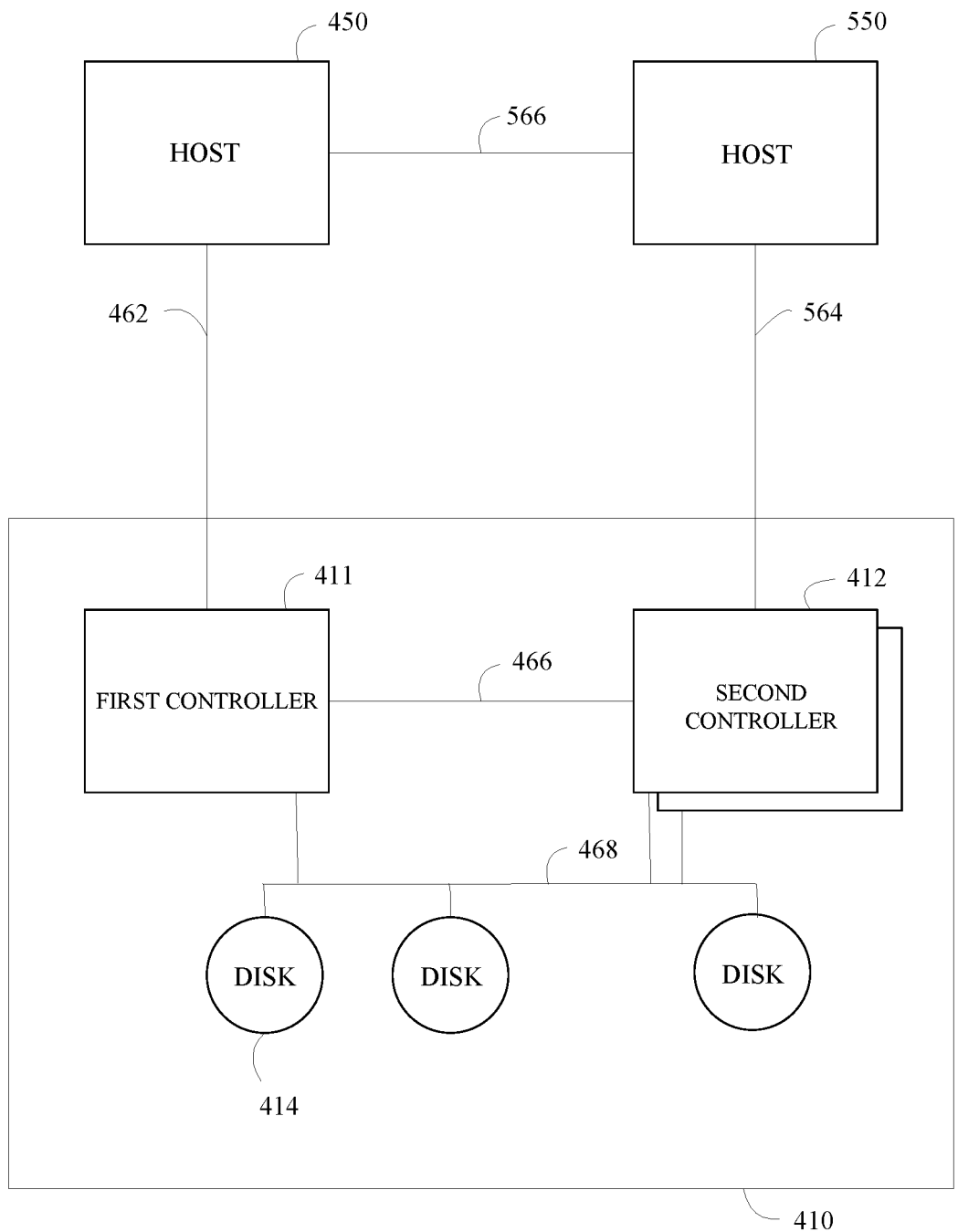
FIG. 5 illustratively shows another environment comprising a storage system having a plurality of storage controllers in which embodiments in accordance with the disclosure may be implemented.
Figure 6:
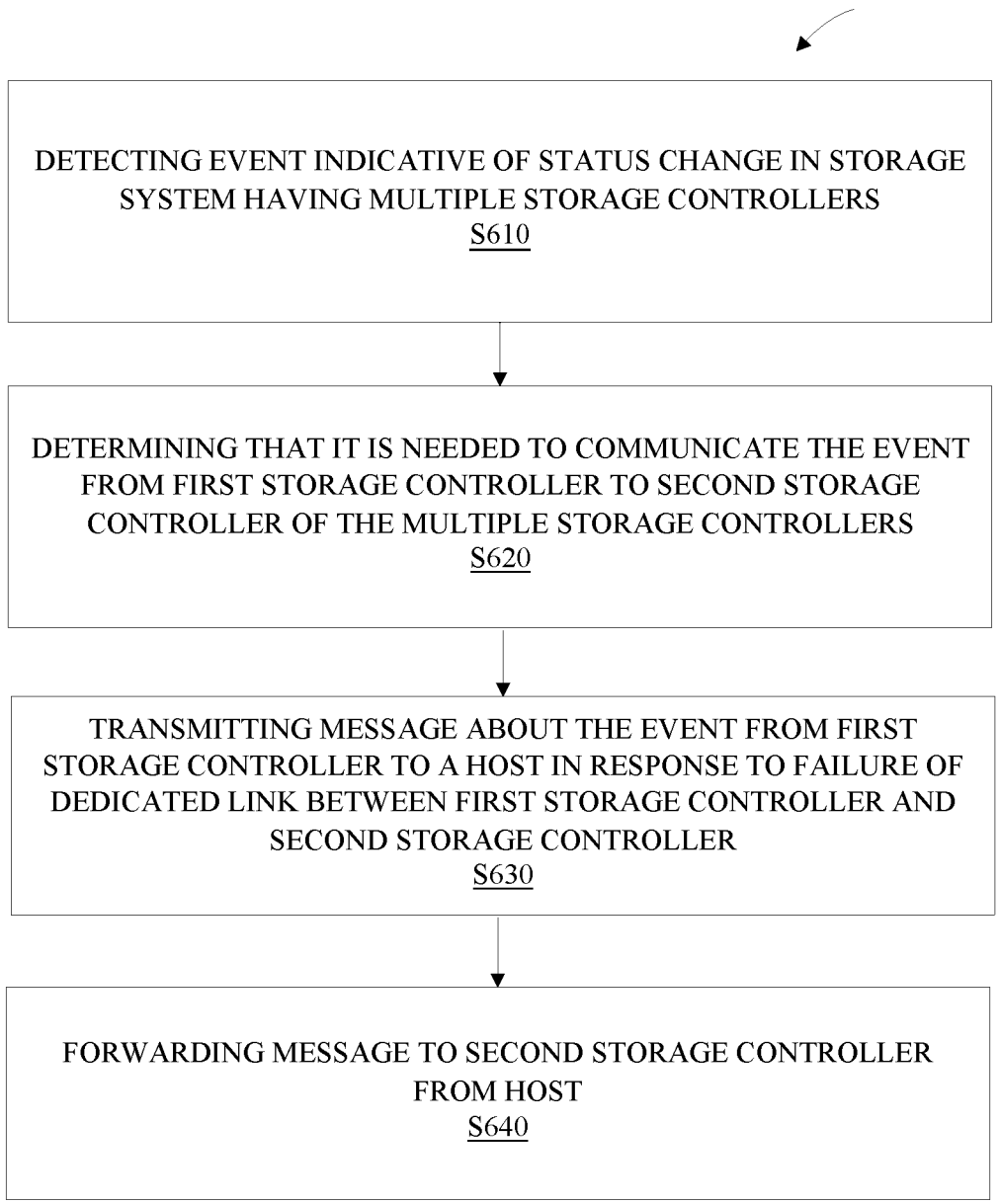
FIG. 6 is a flowchart of the general process of a method according to an illustrative embodiment of the disclosure.

With reference now to FIGS. 4-6, exemplary embodiments of the present disclosure will be described. The exemplary embodiments are directed to a method, system and computer program product for facilitating communication among storage controllers of a storage system.

It should be noted that the method, system and computer program product for facilitating communication among storage controllers of a storage system according to embodiments of this disclosure could be implemented by computer system/server 12 of FIG. 1.

Referring now to FIG. 4, which illustratively shows an environment comprising a storage system having a plurality of storage controllers in which embodiments in accordance with the disclosure may be implemented.

As illustrated in FIG. 4, a storage system 410 in accordance with the present disclosure has a plurality of storage controllers 411 and 412 providing capabilities for cooperating with each other to manage an array of disks 414 and to respond to I/O requests with respective to the array of disks.

An attached host (host device) 450 includes a multipath driver 452 for communicating with a first storage controller 411 and a second storage controller 412 of the storage controllers via high-performance link 462 and high-performance link 464, respectively. Host 450 may direct I/O requests via link 462 and/or link 464 to the first and/or second storage controllers 411 and 412 and receive data returned from the first and/or second storage controllers 411 and 412 in response to the I/O requests. The only function performed by host 450 is that of directing I/O request to storage controllers 411 and/or 412 and receiving data returned from storage controllers 411 and 412 in response to the I/O requests. However, beyond directing I/O requests and receiving data returned in response to the I/O requests, host 450 has no further responsibilities in managing storage system 410. Specifically, host system 450 has no responsibilities in insuring coordination of first and second storage controllers 411 and 412 and recovering errors occurred in storage system 410.

Storage controllers 411 and 412 store and retrieve data on disk drives 414 via link 468. Each of storage controllers 411 and 412 may include an associated storage (not shown) storing procedures and relevant data required for performing its operations.

The first and second storage controller 411 and 412 perform high level storage management on the attached array of disks 414 to improve reliability and overall performance of storage system 410. In the course of the operation of storage system 410, various events may occur signifying either a normal condition or abnormal condition of storage system 410. First and second storage controllers 411 and 412 cooperate to resolve problems in case of abnormal conditions and independent of attached host 450. First and second storage controllers 411 and 412 include capabilities to transfer to each other information about status and status change of storage system 410 as required to perform tasks such as error recovery in order to complete I/O requests sent to storage system 410 by attached host system 450. The information about status and status change may indicate abnormal conditions including, but not limited to, drive/array configuration change, data loss and dead lock, as is well known in the art.

Storage controllers 411 and 412 of the present disclosure cooperate via communications over a dedicated link 466 to exchange information required to perform their tasks. Specifically, they may use link 466 to coordinate transfer of information about status and status change of storage system 410.

As illustrated in FIG. 4, second storage controller 412 can be any number of other storage controllers in storage system 410. A first storage controller 411 is often identified as a primary storage controller. Those skilled in the art will recognize that any number of second storage controllers 412 can operate in conjunction with first storage controller 411 to perform the methods described further herein below. And first storage controller 411 can perform the methods described further herein below in conjunction with any number of second storage controllers. It is to be noted that although the methods presented herein below are presumed to be coordinating communication between a first storage controller 411 and a single second storage controller 412, extension of these methods to a plurality of second storage controllers can be achieved.

Those skilled in the art will recognize that the various communication links 462 through 468 can be any of several well-known, standard communication media and protocols. For example, communication link 462 connecting host 450 to storage controllers 411 and 412 may be, for example, PCIE (Peripheral Component Interconnect Express) connection, a parallel SCSI connection, a FC (Fibre Channel) connection, and so on. Link 466 between the cooperating storage controllers may be any of several well-known communication media and protocols including high-performance FC, simple serial communications, parallel SCSI, and others. Lastly, link 468 may be any of several well-known communication media and protocols used for connecting to individual mass storage devices such as parallel SCSI, Fibre Channel, and so on.

Referring now to FIG. 6, which shows a flowchart of the general process of a method according to an embodiment of the disclosure. In general, FIG. 6 shows a computer-implemented method 600 comprising a Step S610 of detecting, by one or more processors, an event indicative of status change in a storage system having a plurality of storage controllers; a Step S620 of determining, by one or more processors, that it is needed to communicate the event from a first storage controller to a second storage controller of the storage controllers; a Step S630 of transmitting, by one or more processors, a message about the event from the first storage controller to an attached host in response to failure of a dedicated link between the first storage controller and the second storage controller; and a Step S640 of forwarding, by one or more processors, the message from the host to the second storage controller.

For the purpose of illustration, method 600 is implemented in connection with the storage system 410 depicted in FIG. 4, for example. As mentioned above, storage system 410 comprises a plurality of storage controllers (hereinafter also referred to as "controllers") including a first storage controller 411 (hereinafter also referred to as "first controller 411" or simply "controller 411") and a second storage controller 412 (hereinafter also referred to as "second controller 412" or simply "controller 412")

Specifically, Step S610 involves detecting an event indicative of status change in a storage system 410 having a plurality of storage controllers 411, 412.

As discussed above with reference to FIG. 4, in the course of the operation of storage system 410, various events can occur signifying a condition, either normal or abnormal, of storage system 410.

According to an embodiment of the disclosure, and as discussed above, the event detected in Step S610 may be indicative of at least one of the following abnormal conditions: drive/array configuration change, data loss, and dead lock.

For ease of description and understanding, here it is assumed that the event is detected by first controller 411 in normal way known in the art. It shall be appreciated that Step S610 may also be performed with a separate module in conjunction with first controller 411.

As discussed above, in case of abnormal conditions, first and second storage controllers 411 and 412 would cooperate to resolve problems. After Step S610, the process proceeds to Step S620, which involves determining that it is needed to communicate the event from a first storage controller 411 to a second storage controller 412 of the storage controllers. For example, if the event is detected by first controller 411, which indicates an abnormal condition, such as drive/array configuration change, it may be determined that there is a need to notify the event to a peer controller, which is second controller 412 in this case. However, if the event is indicative a normal condition, usually there is no need to notify second controller 412 of the event.

After Step S620, the process proceeds to Step S630, which involves transmitting a message about the event from first controller 411 to an attached host 450 in response to failure of a dedicated link 466 between the first storage controller 411 and the second storage controller 412.

As discussed above, dedicated link 466 is configured between first controller 411 and second controller 412 for mutual communication between the two controllers. Normally, first controller 411 would directly transfer the message about event to second controller 412 via link 466. However, there are chances that link 466 may be down or interrupted for some reason. If link 466 is interrupted, first controller 411 is unable to transfer the message about the event directly to second controller 412 as usual.

Host 450 can be leveraged to forward the message about the event to second controller 412 in case of failure of link 466. Accordingly, in Step S630, in response to failure of a dedicated link 466 between the first storage controller 411 and the second storage controller 412, the message about the event is first transmitted from first controller 411 to host 450. Specifically, the message is transmitted via dedicated link 462, which is originally designed for host 450 to send I/O requests to first controller 411 and receive data retrieved by first controller 411 in response to the I/O requests.

According to an embodiment of the disclosure, prior to Step S630, method 600 further involves collecting information about the event by first controller 411. In addition, the message about the event to be transmitted in Step S630 may be created beforehand based on the information collected. And the message is created in a format different from a response to I/O request, which contains data to be returned to host 450 from first controller 411 as a result of performing the host's I/O request by first controller 411. As is known to those skilled in the art, it is a matter of design option as to how to format the message differently from a message containing data to be returned to host 450 in response to its I/O requests, and thus there is no need to be described in detail so as not to obscure the focus of the disclosure.

After Step S630, the process proceeds to Step S640, which involves forwarding the message from host 450 to second controller 412. Likewise, the message may be forwarded to second controller 412 via dedicated link 464, which is designed to for host 450 to send I/O requests to second controller 412 and receive data retrieved by second controller 412 in response to the I/O requests. Likewise, prior to forwarding, the message may be further formatted so that it may be distinguished from an I/O request.

The major process of method 600 ends with Step S640, at which message about the event is communicated to second controller 412 from first controller 411. It may be understood that with method 600, a storage controller, such as first controller 411, and its peer storage controller, such as second controller 412, may still conduct communication effectively and timely, even if the dedicated link between them, such as link 466, breaks down.

Besides facilitating communication between peer storage controllers, the present disclosure also proposes to leverage the message transferred between peer controllers to perform error recovery tasks that otherwise may be performed controllers. Specifically, according to an embodiment of the disclosure, method 600 may further involve performing error recovery by host 450 upon receipt of the message about the event transmitted from first controller 411. As shall be appreciated by those skilled in the art, it may be realized by deploying error diagnosis and/or error recovery procedures in host 450 in advance. Host 450 may execute the procedures when it receives the message to be forwarded to from one controller to another. For example, a dead lock occurring in I/O operations on a disk array by peer controllers might be detected if appropriate information is extracted from such a message. It shall be appreciated by those skilled in the art that various schemes of error diagnosis and recovery are well known in the art and they are not the focus of the disclosure. Therefore, related details are omitted here in order to avoid unnecessarily obscuring the disclosure.

In the above description, method 600 is executed with respect to a storage system where two or more of its storage controllers are attached to a single host system. However, the present disclosure is by no means limited to such a configuration.

Referring now to FIG. 5, which illustratively shows an alternative or another environment comprising a storage system having a plurality of storage controllers in which embodiments in accordance with the disclosure may be implemented. As shown, compared with FIG. 4, the only difference in FIG. 5 is the addition of a second host 550 and second controller 412 is now attached to second host 550 via a link 564. Host 550 has a communication link 566 with the host 450, and basically functions the same functions as host 450 in that it may also send I/O requests to second controller 412 and receive data retrieved in response to the I/O requests. Communication link 566 and link 564 can be, for example, PCIE connection, a parallel SCSI connection, a FC (Fibre Channel) connection, and so on.

According to an embodiment of the disclosure, where the second storage controller 412 is attached to a second host 550 which has a communication link 566 with the host 450, Step S640 of method 600 of forwarding the message to the second storage controller from the host can comprise transferring the message from the host 450 to the second host 550 via the communication link 566, and then forwarding the message from the second host to the second storage controller 412.

A typical environment in which embodiments of the disclosure may be implemented is the well-known dual controller RAID (Redundant Arrays of Independent Drives) system, wherein a pair of storage controllers are configured for the management of an array of disk drives. Of course, those skilled in the art shall appreciate that the application of various embodiments of the disclosure is not limited to the RAID system.

The present disclosure may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
    transmitting, by one or more processors, a message about an event indicative of a status change in a storage system from a first storage controller to a host in response to failure of a dedicated link between the first storage controller and a second storage controller, wherein the first storage controller is attached to the host; and
    forwarding, by one or more processors, the message from the host to the second storage controller.

2. The computer-implemented method of claim 1, wherein the second storage controller is attached to a second host which has a communication link with the host, and said forwarding the message from the host to the second storage controller comprises:
- transferring, by one or more processors, the message from the host to the second host via the communication link; and
- forwarding, by one or more processors, the message from the second host to the second storage controller.

3. The computer-implemented method of claim 1, further comprising:
- collecting, by one or more processors, information about the event; and
- creating, by one or more processors, the message about the event based on the information and a format different from a response to an I/O request.

4. The computer-implemented method of claim 1, wherein the event is indicative of at least one of the following abnormal conditions:
- drive/array configuration change;
- data loss; and
- dead lock.

5. The computer-implemented method of claim 1, further comprising:
- performing, by one or more processors, error recovery by the host upon receipt of the message about the event transmitted from the first storage controller.

6. The computer-implemented method of claim 1, wherein the storage system is a dual controller RAID system.

7. A system comprising:
- one or more processors; and
- a computer-readable memory coupled to the one or more processors, the computer-readable memory comprising instructions that when executed by the one or more processors perform actions of:
  - detecting an event indicative of status change in a storage system having a plurality of storage controllers;
  - determining that it is needed to communicate the event from a first storage controller to a second storage controller of the plurality of storage controllers;
  - transmitting a message about the event from the first storage controller to a host in response to failure of a dedicated link between the first storage controller and the second storage controller, where in the first storage controller is attached to the host; and
  - forwarding the message from the host to the second storage controller.

8. The system of claim 7, wherein the second storage controller is attached to a second host which has a communication link with the host, and the actions further comprise:
- transferring the message from the host to the second host via the communication link; and
- forwarding the message from the second host to the second storage controller.

9. The system of claim 7, the actions further comprising:
- collecting information about the event; and
- creating the message about the event based on the information and a format different from a response to an I/O request.

10. The system of claim 7, wherein the event is indicative of at least one of the following abnormal conditions:
- drive/array configuration change;
- data loss; and
- dead lock.

11. The system of claim 7, the actions further comprising:
- performing error recovery by the host upon receipt of the message about the event transmitted from the first storage controller.

12. The system of claim 7, wherein the storage system is a dual controller RAID system.

13. A computer program product comprising a computer readable storage medium having program instructions embodied therewith, the program instructions executable by a processor to cause the processor to perform actions of:
- transmitting a message about an event indicative of a status change in a storage system having plurality of storage controllers from a first storage controller to a host in response to failure of a dedicated link between the first storage controller and a second storage controller, where in the first storage controller is attached to the host; and
- forwarding the message from the host to the second storage controller.

14. The computer program product of claim 13, wherein the second storage controller is attached to a second host which has a communication link with the host, and the actions further comprise:
- transferring the message from the host to the second host via the communication link; and
- forwarding the message from the second host to the second storage controller.

15. The computer program product of claim 13, the actions further comprising:
- collecting information about the event; and
- creating the message about the event based on the information and a format different from a response to an I/O request.

16. The computer program product of claim 13, wherein the event is indicative of at least one of the following abnormal conditions:
- drive/array configuration change;
- data loss; and
- dead lock.

17. The computer program product of claim 13, the actions further comprising:
- performing error recovery by the host upon receipt of the message about the event transmitted from the first storage controller.

18. The computer program product of claim 13, wherein the storage system is a dual controller RAID system.

* * * * *